Sept. 20, 1966　　　　　C. C. WAUGH　　　　　3,273,389
OSCILLATING VANE FLOWMETER

Filed Dec. 9, 1963　　　　　　　　　　　　　　2 Sheets-Sheet 1

INVENTOR.
CHARLES C. WAUGH
BY R. E. Geangue
ATTORNEY

Sept. 20, 1966 C. C. WAUGH 3,273,389
OSCILLATING VANE FLOWMETER
Filed Dec. 9, 1963 2 Sheets-Sheet 2

INVENTOR.
CHARLES C. WAUGH
BY
R. E. Geauque
ATTORNEY

United States Patent Office 3,273,389
Patented Sept. 20, 1966

3,273,389
OSCILLATING VANE FLOWMETER
Charles C. Waugh, 5211 Beckford Ave., Tarzana, Calif.
Filed Dec. 9, 1963, Ser. No. 328,949
10 Claims. (Cl. 73—194)

This invention relates to an oscillating vane flowmeter for measuring the quantity of fluid flowing in a conduit and more particularly to a flowmeter in which the fluid actuated portion moves in an oscillatory manner to eliminate or minimize bearing wear and clogging.

Positive displacement types of flowmeters have been utilized to measure a flowing quantity of fluid when a high degree of accuracy is required, such as in the dispensing of gasoline or other valuable fluids. Meters of this type are of numerous varieties, some utilizing the displacement of a piston in a cylinder to measure the quantity of fluid, and others utilizing rotating discs, rotary vanes, oval shaped gears, or other construction, all involving the displacement of some mechanical portion of the meter due to pressure of the flowing fluid. Also, turbine type flowmeters, in which the fluid causes rotation of an axial flow turbine wheel, have recently been utilized to provide the necessary high accuracy measurements.

All flowmeters of both the positive displacement and the turbine types are limited in usefulness by a common weakness which is inherent in the construction of all versions, namely, the use of bearings to support the moving portion of the meter. Bearings must of necessity, incorporate very close clearances, and are therefore subject to rapid wear or clogging due to abrasive materials which frequently contaminate fluid streams. It is frequently necessary to install filters or screens in the piping upstream of these meters, at considerable cost, both initially and continually thereafter, because of frequent cleaning that is required. Even the finest filter which is practical to install will admit a certain amount of fine material, sufficient to cause substantial bearing wear resulting in loss of accuracy and damage. Furthermore, the best bearing materials are frequently not high corrosion resistant, and conversely the most highly corrosion resistant materials do not make the best bearings. Therefore, flowmeters using bearings are unsatisfactory for many highly corrosive fluids. Similarly, bearings tend to become soft and to wear rapidly at high temperature, further limiting the use of flowmeters utilizing bearings.

In the flowmeter of the present invention, the fluid actuation portion moves in an oscillatory mode to eliminate or minimize bearing wear or clogging. The fluid actuated portion includes a support shaft extending along the conduit and pivotally supported by the conduit near its upstream end. A first vane is integral with the shaft and is located upstream of the pivotal support for the shaft while a second vane is pivoted to the shaft downstream of the pivotal support from the shaft. Thus, when the vanes have lift in opposite directions, the torque about the shaft pivot resulting from both vanes is in the same direction. The pivotal movement of the second vane, which develops the greater torque, is limited by stops on the shaft and after engaging a stop, the second vane moves with the shaft in fixed relationship thereto until the angle of attack of the second vane is reversed, causing the direction of movement of the shaft to be reversed since the second vane has the greater lift. Thus, the two vanes and the shaft have an oscillating motion back and forth across the flowing stream, the frequency of oscillation being proportional to the rate of flow and the total number of oscillations being proportional to the total quantity that has passed through the meter in a given period.

In one form of the invention, the shaft and second vane are supported by flexural members instead of bearings to entirely eliminate bearing wear or clogging and in another configuration, pivot bearings are used, but wear is minimized because angular motion of the pivots is small. Both embodiments are simple and inexpensive to construct and yet are able to measure corrosive fluids, high temperature fluids, or fluids containing abrasive particles without damage or loss of accuracy.

It is therefore an object of the present invention to provide a flowmeter comprising vane means pivotally mounted for oscillation back and forth across a flowing stream at a frequency proportional to the rate of flow of the stream.

Another object of the invention is to provide an oscillating vane flowmeter capable of measuring flow of corrosive fluids, high temperature fluids and fluids containing abrasive particles with minimum damage to the support means for the moving portion of the meter.

Another object of the invention is to provide an oscillating vane flowmeter which produces highly accurate measurements of fluid quantity flow and which has flexural support of all moving parts.

A further object of the invention is to provide a flowmeter which is simple and inexpensive in construction and dependable in service.

These and other objects of the invention not specifically set forth above will become readily apparent from the accompanying description and drawings in which.

Figure 1:
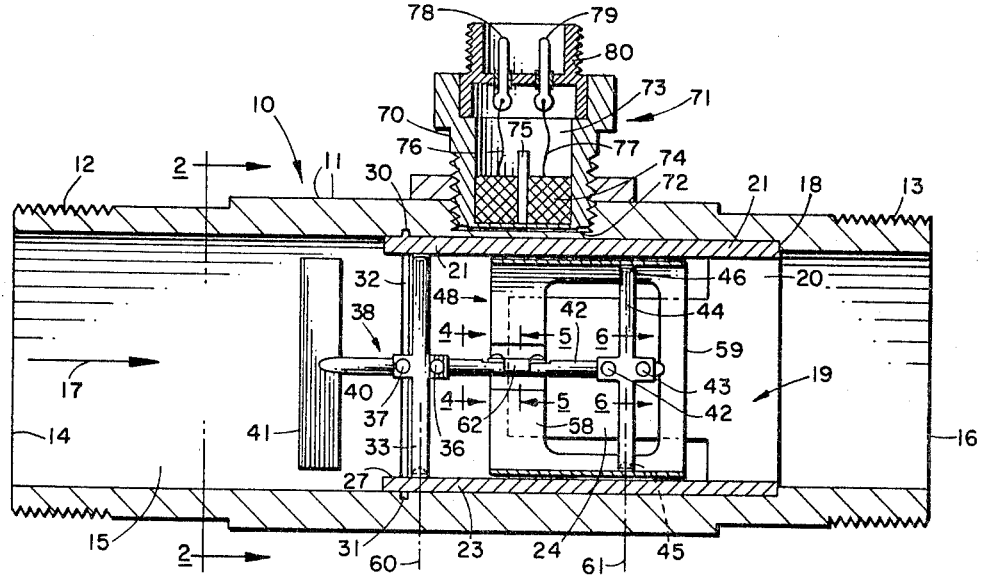
FIGURE 1 is a vertical section along line 1—1 of FIGURE 2 of the flowmeter of the present invention showing the vanes and the electrical pickup for measuring volume flow rate.

Referring to the embodiment of the invention chosen for illustration in FIGURE 1, the flowmeter 10 has a cylindrical case 11 which is threaded at ends 12 and 13 for coupling with piping for the fluid, the volume flow rate of which is to be measured. The fluid enters at inlet port 14, flows through passage 15 and exits at outlet port 16 so that the fluid flows in the direction of arrow 17. An interior circumference of passage 15 is reduced to form shoulder 18 and a cylindrical support member 19 is inserted into the passage until its end abuts shoulder 18. The member 19 comprises a cylindrical band 20 at its downstream end from which projects four separate arms 21, 22, 23, and 24. The outer surface 26 of each arm is curved to fit snugly against the interior of passage 15 and the inner surface 27 of each arm is flat. Arms 21 and 23 are longer than arms 22 and 24 and have ribs 30 and 31 respectively, which snap into a groove 32 in the casing 11 to restrain member 19 from moving toward port 14.

Figure 3:
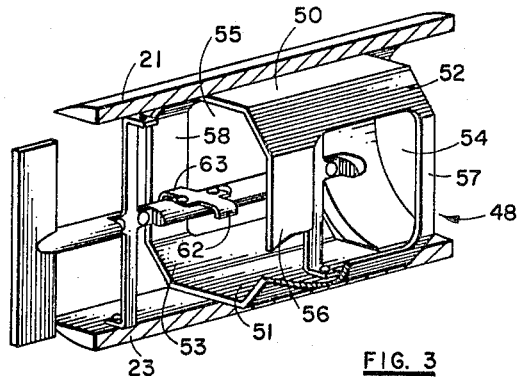
FIGURE 3 is a perspective view of the shaft and the two vanes supported thereon.
Figure 2:
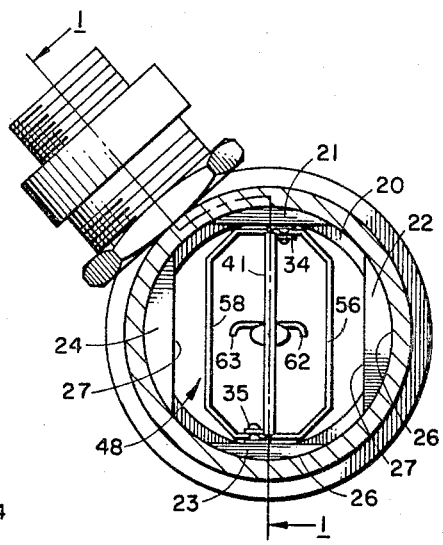
FIGURE 2 is a transverse vertical section along line 2—2 of FIGURE 1.
Figure 4:
FIGURE 4 is an enlarged section of the vane mounting shaft taken along line 4—4 of FIGURE 1.
Figure 6:
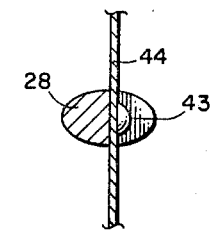
FIGURE 6 is an enlarged section along line 6—6 of FIGURE 1 showing the flexural support for one of the vanes.

A flexural support member, consisting of a flat thin metal strip 33, extends between the upstream ends of arms 21 and 23 and the ends of the strip are bent into feet 34 and 35 which are riveted or otherwise attached to the arms. Strip 33 has flanges 36 and 37 at its center which are riveted, or otherwise attached to a flattened section of support member or shaft 38 which is generally oval in shape (as illustrated in FIGURE 4) and extends along the axis of the passage 15 when the strip 33 is not flexed. A section 40 of shaft 38 extends upstream from strip 33 and carries a flat vane 41 which normally intersects the axis of passage 15. Also, a section 42 of shaft 36 extends downstream from strip 33 and has a flat portion (see FIGURE 6) for mounting the flanges 42 and 43 of a second flexure member 44 having the form of a thin metal strip. The ends of strip 44 are formed into feet 45 and 46 which are attached to a second vane 48. As illustrated in FIGURE 3, vane 48 comprises an envelope having a solid top panel 50, a solid bottom panel 51 and side panels 52 and 53, having openings 54 and 55, respectively. Van sections 56 and 57 are located in side 52 on the upstream and downstream sides of opening 54 and vane sections 58 and 59 are located in side 53 on the upstream and downstream sides of opening 55. The portion of sides 52 and 53 on the other sides of openings 54 and 55 are tapered inwardly so as not to engage the interior of casing 11 as the vane 48 moves back and forth in passage 15.

Figure 5:
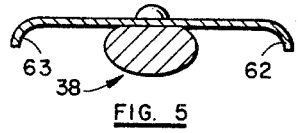
FIGURE 5 is a enlarged section along line 5—5 of FIGURE 1 showing the stops carried by the shaft.
Figure 8D:
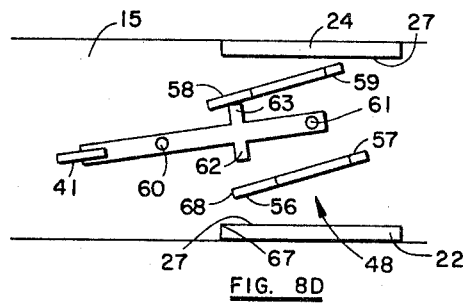

The vane 41, flexure members 33, 44, and vane sections 56, 57, and 58, 59 all extend perpendicularly to the same transverse plane through the centerline of passage 15. Also, the shaft 38 is free to rotate, with little restraining force, about axis 60 of strip 33 and vane 48 is free to rotate relative to shaft 38 about axis 61 of strip 44. However, the rotation of vane 48 is limited to about 10 degrees in either direction by the stop arms 62 and 63 which are riveted to shaft 38 (see FIGURE 5). At the limit of rotation in one direction, the end of arm 62 engages vane section 56 and at the other limit, the end of arm 63 engages vane section 58. Axis 61 is downstream of the center of lift of vane 48 which is comprised of the resultant of the lift of all the vane sections. The vane sections 57 and 59 are downstream of pivot axis 61 so that they produce a lift which opposes the lift of vane sections 56 and 58. However, vane sections 57 and 59 are smaller and closer to axis 61 so that the lift force of vanes 56 and 58 predominates and controls the movement of vane 48. Also, the lift of all the sections of vane 48 is greater than the lift of vane 41 about the axis 60.

Figure 8A:
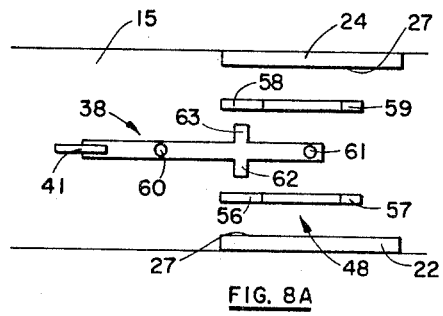
FIGURES 8A through 8D are diagrammatic views in horizontal section progressively showing the manner in which the vanes oscillate.
Figure 8B:
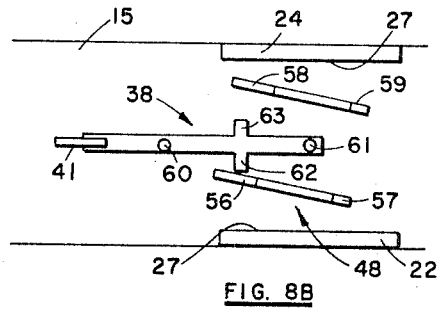
Figure 8C:
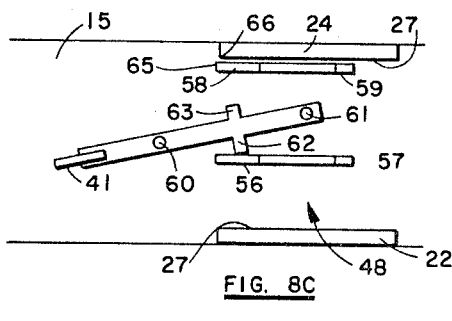

Referring to FIGURES 8A through 8D, the positions of the vanes 41 and 48 are diagrammatically illustrated as the vanes oscillate back and forth across the passage. In FIGURE 8A, both vanes are centered in an unstable condition because of the downstream location of axis 61 from the center of lift of vane 48. Flow through passage 15 will therefore cause vane 48 to rotate and cause vane section 56 to immediately strike stop arm 62 as shown in FIGURE 8B. In this position, the vane sections of vane 48 all have a high angle of attack with the fluid, causing a lift force which rotates shaft 38 about axis 60 (see FIGURE 8C). Rotation of shaft 38 simultaneously reduces the angle of attack of vane 48 and increases the angle of attack of vane 41. When the angle of attack of vane 48 approaches zero as shown in FIGURE 8C, its lift also approaches zero, and motion would stop, except that torque due to the lift force on vane 41 causes continued movement of vane 48 until there is a slight angle of attack in the opposite direction between vane 48 and the fluid. The opposite angle of attack is enhanced by the infringement of fluid on the leading edge 65 of vane section 58 as it changes direction in rounding the corner 66 on the arm 24 (see FIGURE 8C). When the angle of attack reverses, the vane 48 rotates about axis 61 until vane section 58 engages stop 63 (see FIGURE 8D) and vane 48 assumes a high angle of attack with the fluid, causing opposite rotation of shaft 38 about axis 60 and overcoming the torque in the original direction due to vane 41. As vane section 56 approaches the flat surface 27 of arm 22, the angle of attack again approaches zero and further movement by vane 41 causes the angle of attack to again reverse so that shaft 38 will again rotate in its original direction. This reversal of angle of attack is enhanced by the flow of fluid rounding corner 67 of arm 22 and impinging on the leading edge 62 of vane section 56.

The oscillation cycle described above repeats itself continuously so long as fluid flows through passage 15 and the frequency of the movement has been found to be closely proportional to fluid velocity. In order to obtain a measure of frequency, the casing 70 of an electromagnetic pickup 71 is threaded into an opening 72 in the casing 11 at a location opposite vane 48. The casing 70 has a cavity 73 containing a winding 74 which surrounds a magnet 75. The leads 76 and 77 of winding 74 connect with terminal pins 78 and 79, respectively, which are supported by threaded insert 80 located in the end of casing 70. As the vane 48 moves relative to the pickup 70, the reluctance of the magnetic field varies thereby providing an electrical output pulse at pins 78 and 79 for each cycle of vane 48. By measuring the frequency of the output pulses, a value of volume flow rate is obtained for the fluid flowing in passage 15.

Figure 7:
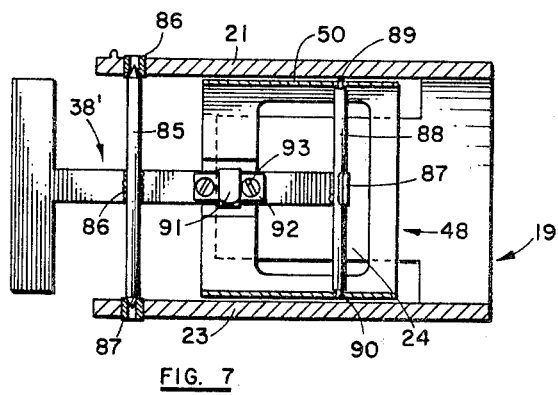
FIGURE 7 is a partial vertical section similar to FIGURE 1 illustrating a modification of the invention in which the vanes are supported by pivot bearings.

A modification of the invention is illustrated in FIGURE 7 wherein shaft 38 is secured to a pivot rod 85 which has its ends supported by bearings 86 and 87 in arms 21 and 23, respectively, of support member 19. The shaft 38 comprises a flat plate which is welded at intermediate position 86 to the rod 85 and the end 87 of the plate is wrapped around and secured to a pivot rod 88. Reduced ends 89 and 90 of rod 88 are secured in openings in the top and bottom plates 50 and 51, respectively, of vane 48 in order to pivotally mount vane 48. A pair of stops 91 extend from a flange 92 which is secured to shaft 38′ by rivots 93. The two stops 91 (only one of which is shown) are located in the same position as stops 62, 63 of the prior embodiment to permit approximately 10° rotation of vane 48 on either side of sshaft 38′. Thus, the embodiment of FIGURE 7 utilizes rigid pivot rods 85 and 87 instead of strips 33 and 44 to pivotally mount shaft 38′ and vane 48 respectively. While small pivot bearings are utilized at the ends of the shafts 85 and 88, bearing wear is minimized because angular motion of the pivots is small. In operation, the modification of FIGURE 7 functions in the same manner as the prior embodiment to provide output pulses representing flow rate, it being understood that the support member 19 of FIGURE 7 is supported in casing 11 in a manner as shown in FIGURE 1.

The oscillator vane assembly of the present invention consists of an upstream vane fixed to a pivotally mounted shaft and a second downstream vane pivotally supported on said shaft at a location downstream from the center of lift of the second vane. Preferably, the axial width of the vane 41 and of the same section of vane 48 are such that they do not normally overlap and interfere with flow over one another. Also, the construction of the vanes 41 and 48 can be varied so long as the action of the lift forces is not changed, and various types of pickoff assemblies can be utilized to sense the oscillation of the vane assembly. Various other modifications are contemplated by those skilled in the art without departing from the spirit and scope of the invention as hereinafter defined by the appended claims.

What is claimed is:
1. In a flowmeter for measuring the rate of flow of a fluid through a conduit, flow rate sensing means comprising,
    an elongated support member within and extending along said conduit,
    first pivot means pivotally mounting said support member on said conduit for turning about a first pivotal axis extending transversely of said conduit, first vane means connected with said support means upstream of said first pivotal axis, second vane means located downstream of said first pivotal axis, second pivot means pivotally supporting said second vane means on said support member for turning about a second pivotal axis generally parallel to said first pivotal axis and located downstream of the center of lift of said second vane means, and stop means for limiting the angular motion of said second vane means relative to said support member.

2. Flow rate sensing means as defined in claim 1 wherein said first and second pivotal axis are positioned so that at least a part of the lift on said second vane means can oppose at least a part of the lift on said first vane means, said second vane means producing a greater torque about said first pivot axis than said first vane means.

3. In a flowmeter wherein the rate of flow of a fluid through a conduit is measured by response to a flow sensing means, said means comprising, an elongated support member, first pivot means extending across said conduit and secured to said support member at a point intermediate its ends and at the center of said conduit, said first pivot means having a first pivot axis extending transversely of said conduit, first vane means secured to the upstream end of said support member for producing a torque on said support member about the axis of said first pivot means, second vane means located downstream of said first pivot means, second pivot means pivotally supporting said second vane means on the downstream end of said support member said second pivot means having a second pivot axis generally parallel to said first pivot axis, the center of lift of said second vane means being upstream of the axis of said second pivot means to produce a torque about both said first and second pivot axes, the lift force of said second vane means about said first pivot axis, being greater than the lift force of said first vane means; and stop means carried by said support member for limiting the rotation of said second vane means in either direction about said second pivot axis, said first and second vane means oscillating together within said conduit to provide a frequency signal representative of flow rate through said conduit.

4. Flow rate sensing means as defined in claim 3 wherein said first pivot means comprises a flexure member secured to said conduit at its opposite ends, and said second pivot means comprising a second flexure member secured to said second vane means at its opposite ends.

5. Flow rate sensing means as defined in claim 3 wherein said first and second pivot means each comprise a rigid shaft, and pivot bearing means for supporting each of said shafts for oscillatory movement.

6. Flow rate sensing means as defined in claim 3 wherein said second vane means comprises separate vane sections located on opposite sides of said second pivot axis for producing a torque about said first pivot exceeding that of said first vane means.

7. Flow rate sensing means as defined in claim 6 having support means extending into said fluid along the interior surface of said conduit, said vane sections changing angle of attack when approaching said support means, the flow between said support means and the adjacent vane section being in a direction to increase the change in angle of attack.

8. Flow rate sensing means as defined in claim 7 wherein said support means comprises a pair of opposite flat surfaces extending into said fluid slightly downstream of the upstream end of said second vane means.

9. In a flowmeter for measuring the rate of flow of a fluid through a conduit, flow rate sensing means comprising:

a member pivotally mounted within said conduit for turning on a first pivot axis extending transversely of said conduit;

vane means pivotally mounted on said member for turning on a second pivot axis generally parallel to and offset from said first pivot axis;

the center of lift of said vane means being located upstream of said second pivot axis, whereby said vane means has an unstable neutral position relative to the direction of fluid flow through said conduit wherein said vane means has substantially zero angle of attack relative to said flow direction;

means for limiting angular movement of said member and vane means relative to said conduit in either direction about said first pivot axis;

means for limiting angular movement of said vane means relative to said member to either side of a central position relative to said member wherein said vane means is generally parallel to the plane containing said pivot axes, whereby fluid flow through said conduit is effective to rotate said vane means from its neutral position to one of its limiting positions relative to said member and thereby to create a torque on said member for rotating said member and vane means to one limiting position of said member and vane means about said first pivot axis; and means for effecting rotation of said vane means relative to said member to reverse the angle of attack of said vane means relative to said flow direction as said member and vane means approach each limiting position thereof about said first pivot axis, whereby said member and vane means are caused to oscillate about said first pivot axis at a frequency related to flow rate through said conduit.

10. Flow rate sensing means according to claim 9 wherein:

said vane means is located downstream of said first pivot axis;

said vane means when in either of its limiting positions relative to said member is angularly movable with said member in the direction of the corresponding limiting position of said member and vane means about said first pivot axis through a zero lift position wherein said vane means has substantially zero angle of attack relative to said flow direction to said corresponding limiting position wherein said vane means has a slight reverse angle of attack relative to said flow direction, whereby movement of said member and vane means to either limiting position thereof about said first pivot axis under the action of fluid on said vane means occasions rotation of said vane means relative to said member to reverse the angle of attack of said vane means relative to said flow direction; and said angle of attack reversing means comprises second vane means mounted on said member upstream of said first pivot axis for effecting angular movement of said member and first mentioned vane means through each of said zero lift positions to the adjacent limiting position of said first vane means and member about said first pivot axis under the action of fluid on said second vane means.

References Cited by the Examiner

UNITED STATES PATENTS

| | | | |
|---|---|---|---|
| 3,116,639 | 1/1964 | Bird | 73—194 |
| 3,175,398 | 3/1965 | Sundin | 73—194 |
| 3,175,399 | 3/1965 | Medlar | 73—194 |

RICHARD C. QUEISSER, *Primary Examiner.*

EDWARD D. GILHOOLY, *Assistant Examiner.*